April 22, 1958 — C. F. HAUTAU — 2,831,423
MULTIPLE STATION PRESS
Filed Aug. 7, 1956 — 2 Sheets-Sheet 1

CHARLES F. HAUTAU, INVENTOR.
BY Allen M Kross
Agent

April 22, 1958   C. F. HAUTAU   2,831,423
MULTIPLE STATION PRESS

Filed Aug. 7, 1956   2 Sheets-Sheet 2

CHARLES F. HAUTAU, INVENTOR.

BY

United States Patent Office 2,831,423
Patented Apr. 22, 1958

2,831,423

MULTIPLE STATION PRESS

Charles F. Hautau, Huntington Woods, Mich.

Application August 7, 1956, Serial No. 602,651

4 Claims. (Cl. 100—207)

This invention relates to presses, and more particularly to be heavy duty metal working presses having a plurality of work stations and equipment for automatic work handling between those stations.

Presses for applying a force or a pressure to a workpiece may be generally spoken of as being comprised of three basic units: first, a work supporting unit; secondly, a means for applying force to the workpiece; and third, means within the press for absorbing the reaction to the force applied to the workpiece. This third component which generally consists of tie rods connecting the upper and lower members of the press considerably limits the various configurations which the press may assume. In order to avoid applying bending forces to these tie members it is necessary that the loads be applied to them be confined to the vertical plane. Therefore, these members generally surround the work supporting station. Because of this, they limit the size of a workpiece that may be placed in the station. In addition, they limit the accessibility to the pressing area which is necessary for efficient work handling processes.

The present invention obviates the foregoing disadvantage caused by the normal tying methods by providing a novel press configuration which generally comprises a single upright column that both guides and supports an annular ram and also acts as a tieing member for absorbing the forces exerted by the ram. The ram carries a plurality of die members each of which co-acts with a mating member supported on a lower platen to form a pressing set. This configuration therefore provides a plurality of work stations around the single central column. The forces exerted by the various work stations are so adjusted as to avoid imposing any large bending forces on the column. Thus, the work stations are accessible from all except their back sides. This makes it possible to provide work handling equipment which is also supported on the central column and is so disposed and constructed as to carry work pieces from one working station on the press to the next work station, allowing a single part which requires a plurality of different pressing operations to be operated upon by each of the work stations successively.

Such an arrangement has numerous advantages with respect to the prior art technique of providing a plurality of single station presses and providing means for removing workpieces from one of these presses and conveying it to the successive press. The first of these advantages is economy of pressing equipment. In the present invention a single press serves to perform the multitude of operations that were formerly performed in a multitude of presses. The second advantage is saving in working area. Even if it were possible to arrange the group of presses so close to one another that the work stations were separated by no greater distance than exists in the present press they would still require a work area which would be pi times as long as the diameter of the present press squared over four. The third advantage is convenience in work handling equipment. In the present press a work handling device with a plurality of arms which are all actuated from a central source and in timed relationship to one another may be provided as opposed to the plurality of work handling means normally utilized by the prior art.

It is therefore an object of the present invention to provide a press which utilizes a single, central guide and stress member.

It is a further object of the present invention to provide a press which uses a single, central guide and stress member surrounded by a plurality of working stations.

Another object of the present invention is to provide a press having a central stress member which supports work handling means and may be utilized to convey work pieces between a plurality of work stations.

Another object of the present invention is to provide a press having a plurality of work stations and work handling means for conveying parts successively said plurality of stations.

A further object is to provide a press having a plurality of work stations and material handling means having a plurality of working arms each of which is actuatable from a single central source.

Other objects, advantages and applications of the present invention will be made apparent by the following detailed description of an embodiment of the present invention. The description makes reference to the accompanying drawings in which.

Figure 1:
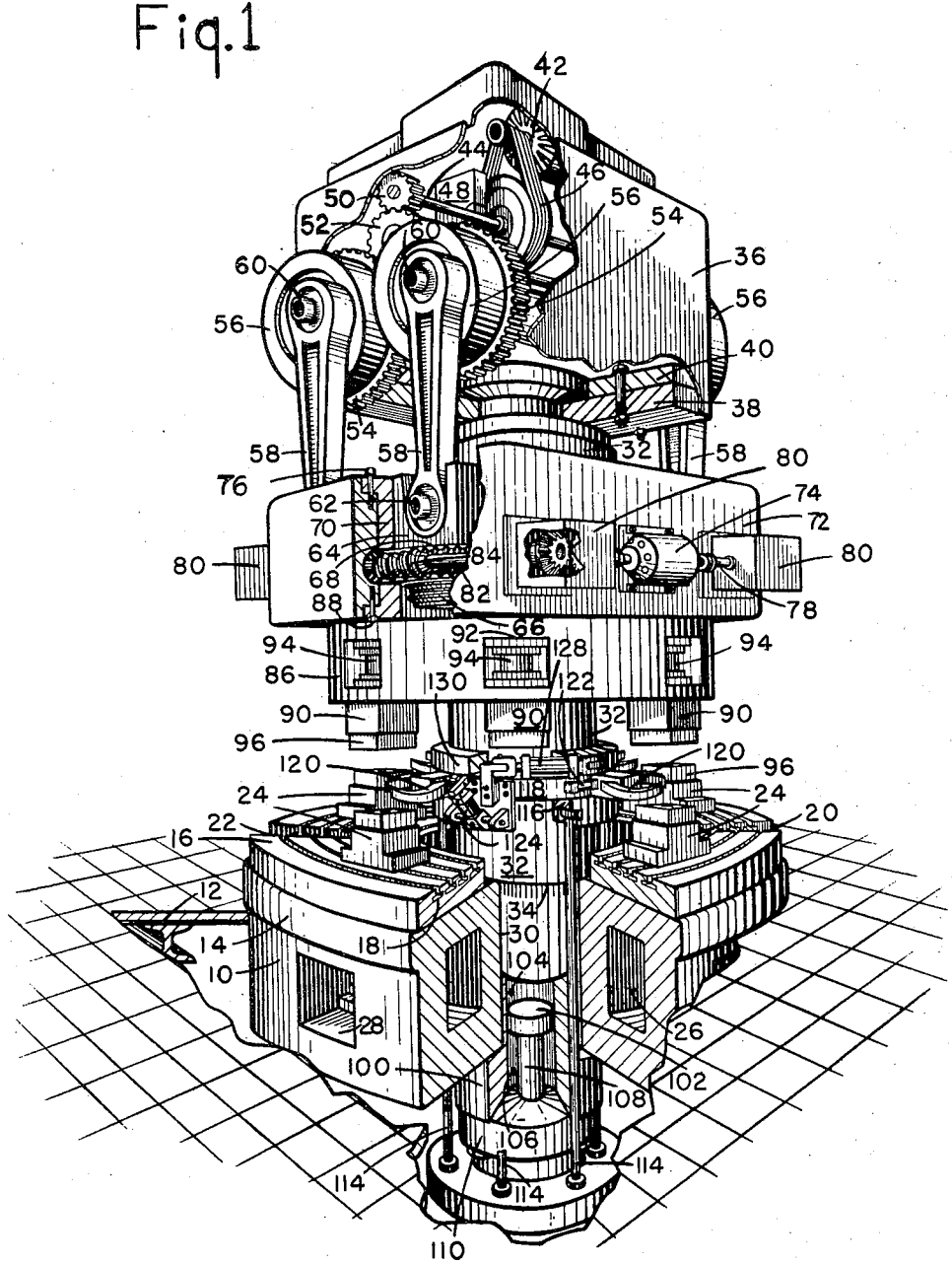
Figure 1 is a perspective view of the press with certain sections cut away.
Figure 2:
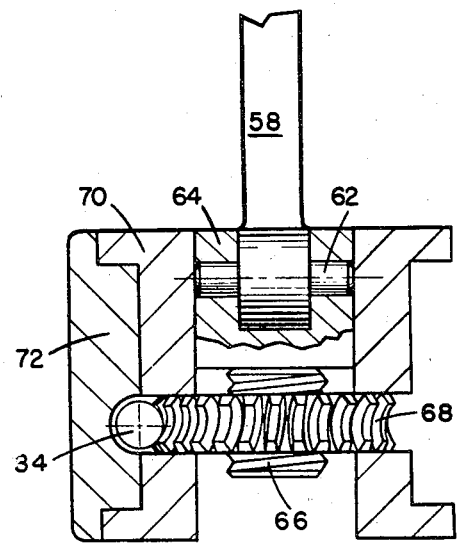
Figure 2 is an elevational section view of the ram supporting member of the press.

An angular press bolster 10 is supported in a floor 12 at a shoulder 14 which is larger than the hole in the floor. At its top surface the bolster 10 supports an angular track 16 which has a plurality of T slots 18 cut in its face. The track 16 has pie shaped sectors 20 and 22 cut out of it to allow over die blocks 24 to be placed in the tracks 18 through the use of T bolts (not shown). The die blocks 24 may therefore be adjusted to any position on the track 18 and any spacing from one another that is suitable. An angular chamber 26 through the body of the bolster 10 is made accessible to the under side of the floor through a series of radial openings 28 in the bolster 10. These openings allow hydraulic die cushions such as are well known to those skilled in the art to be adjusted beneath each lower die block 24.

The press bolster has a central internal bore 30 which supports a cylindrical column 32 by means of a shoulder 34 on the column 32 which rests on the edge of the bore 30. The column 32 extends vertically through the press at its top end. It supports a crown 36 by means of a plate 38 which is welded to the crown 36 and is bolted to a plate 40 which in turn is welded to the column 32.

An electric motor 42 is housed in the crown 36 so as to drive the gear shaft 44 through a pulley and belt arrangement 46. The gear shaft 44 is journaled in a pillow block 48 which is supported on the crown 36 proper. The gear shaft 44 carries gears 50 at each end. Since the shaft 44 and the members that it drives are symmetrical only half of the shaft 44 that is shown will be described. The gear 50 drives an idler gear 52 which in turn meshes with two ring gears 54. The ring gears 54 are simultaneously driven in the same direction by the rotation of the motor 42 as connected through the gears 50 and 52.

Each of the gears 54 supports a large crank 56. Since that arrangement is symmetrical there are four cranks 56 in all. Connecting rods 58 are supported at one of their ends on crank pins 60 which are mounted off center on the cranks 56. At the lower ends each of the connecting rods 58 is connected by means of pins 62 to bearing blocks 64. The bearing blocks 64 have large size screw threads 66 cut in their lower ends. A large diameter nut 68 is adjustably supported on the threads 66. The nuts in turn support the press frame 70 and the adjustment mechanism housing 72 which is bolted to the ram frame 70 as at 76.

The adjustment housing 72 carries a motor 74 which powers a double extended bevel gear shaft 78. Right angle gear drives 80, also supported on the adjustment housing 72 connects the motor 74 with two large worm gear shafts 82 (only one of which is shown; the other being of identical structure). Each of the worm gears 82 is in mesh with a worm surface 84 on the adjustment nuts 68. Therefore, when the motor 76 turns it communicates its rotation through the shaft 78 and the gear box 80 and the shafts 82 in order to turn the adjustment nuts 68 on the threads 66 of the bearing blocks 64. This action raises or lowers the entire ram frame 70 with relation to the bearing block 64. In this manner the throat adjustment on the dies may be controlled in order to allow replacement of the dies and to control the nature of the force exerted by the press.

An annular die housing 86 is bolted to the ram frame as at 88 and supports a plurality of upper die halves 90. A series of radial recesses 92 in the die housing 86 allow access to the plurality of hydraulic die cushions 94 which are adjusted in a manner well known to those skilled in the art to control the force exerted by the press.

The normal operation of the press is therefore seen to be actuated by the motor 42 which acts through its pulley drive 46 gear train 50, 52, and 54 in order to drive the cranks 56 in unison. As the crank members 56 rotate the eccentric motion of the pins 60 is transmitted to the bearing blocks 64 and their appended nuts 68. This reciprocal force is in turn transmitted to the ram frame 70 which reciprocates the die housing 86 and its associated upper die halves 90. The working dies 96 which are contained on the upper and lower die blocks may be different in construction so as to perform a plurality of operations on a single part or a plurality of different operations on different parts, or they may all be of the same structure as to handle a large number of identical parts at the same time.

When the dies are designed so as to perform a series of operations on a single part it is desirable to include a work handling system which will automatically transfer a part through a sequence of the pressing operations. Such apparatus is supported on the central column 32. At the lower end of the column 32 a hollow cylinder 100 is attached to and supported by the column 32. The cylinder 100 contains a piston 102 which moves along the internal bore of the cylinder 100 when actuated by fluid pressure which is introduced and removed from the cylinder 100 through ports 104 and 106. The piston 102 drives a rod 108 which projects through a central boring nut cylinder head 110 and connects to a radial ring 112 which rides on the cylinder head by means of the group of radial arms (not shown). A series of connecting rods 114 have their lower ends journalled in the ring 112 and connect to T slots in an angular ring 116 at their upper ends. Another ring 118 is slidably supported on the ring 116. The ring 118 carries a number of work clamps 120 which is one greater than the number of work stations so as to allow for the introduction of work to the press. The work clamps 120 are opened and closed by means of air cylinders 122 which move one of the clamp's arms so as to open or close it about part. Each gripper arm 120 is supported in a vertical plane by the trunnion mounted air cylinders 124 which have their lower end pivotably mounted on blocks 126 supported on the slidable ring 118.

Rotational motion is imparted to the ring 118 so as to move the work clamp between stations by an air cylinder 128 which has one end fixed to a ring 130 that is supported on the central column 32. An extension of the rod of cylinder 128 causes the work clamps mounted on the ring 118 to move to the left of the drawing in Figure 1 while a retraction of the rod causes the work clamps 120 to move toward the right in a counterclockwise direction.

In operation a workpiece is introduced to the one clamp that is positioned intermediate of two work stations. The cylinder 128 then extends its rod so as to move the work cylinder 100 which extends its rod 108 so as to lower the workpiece carried by the clamps 120 into position over the station. When a workpiece is positioned over the lower die 96 the cylinders 122 are actuated to open the clamps 120 and deposit the workpieces in the dies.

Next the cylinders 124 extend their rods so as to swing the arms 120 into vertical positions where they will clear the dies 96 when the ram 70 descends. During the pressing action cylinder 128 acts so as to return the arms 120 to their starting positions.

Having thus described my invention I claim:

1. A press comprising a vertical column; an annular ram member having an aperture therethrough and a plurality of die members disposed thereon, said ram member being slidably disposed concentrically about said column; a fixed head at one end of said column, a reciprocating drive assembly mounted on said head and drivingly connected to said ram; a bolster member connected to said column and disposed with respect thereto so as to be acted on by said ram; a plurality of die members carried by said bolster member and arranged to cooperate with the die members carried by said ram member, the arrangement of the ram member column and bolster member being such that the reactions to all of the compressive forces exerted by the ram on the bolster are absorbed by the column.

2. A press comprising a vertical column; a ram member having an aperture therethrough and a plurality of die members disposed thereon, said ram member being slidably disposed concentrically about said column; a fixed head at one end of said column, a reciprocating drive assembly mounted on said head and drivingly connected to said ram; a bolster member connected to said column and disposed with respect thereto so as to be acted on by said ram; a plurality of die members carried by said bolster member and arranged to cooperate with the die members carried by said ram member, the arrangement of the ram member column and bolster member being such that the reactions to all of the compressive forces exerted by the ram on the bolster are absorbed by the column.

3. A press having the structure of claim 1 and including a plurality of work handling means disposed radially about said column for moving work from one of said plurality of die members to another and means for opening, closing and moving said work handling means in timed relation to the reciprocation of said press.

4. A press having the structure of claim 2 and including a plurality of work handling means disposed radially about said column for moving work from one of said plurality of die members to another and means for opening, closing and moving said work handling means in timed relation to the reciprocation of said press.

References Cited in the file of this patent

UNITED STATES PATENTS 2,676,436     Zampieri _____ Apr. 27, 1954

FOREIGN PATENTS 578,039     France _____ Sept. 15, 1924